US012174079B2

(12) United States Patent
Krumbholz et al.

(10) Patent No.: US 12,174,079 B2
(45) Date of Patent: Dec. 24, 2024

(54) SEPARATING MEMBRANE, DIAPHRAGM SEAL WITH A SEPARATING MEMBRANE OF SAID TYPE, AND PRESSURE MEASURING UNIT WITH A DIAPHRAGM SEAL OF SAID TYPE

(71) Applicant: Endress+Hauser SE+Co. KG, Maulburg (DE)

(72) Inventors: Andreas Krumbholz, Maulburg (DE); Davide Parrotto, Weil am Rhein (DE); Igor Getman, Lörrach (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 288 days.

(21) Appl. No.: 17/757,541

(22) PCT Filed: Dec. 1, 2020

(86) PCT No.: PCT/EP2020/084091
§ 371 (c)(1),
(2) Date: Jun. 16, 2022

(87) PCT Pub. No.: WO2021/121964
PCT Pub. Date: Jun. 24, 2021

(65) Prior Publication Data
US 2023/0026285 A1 Jan. 26, 2023

(30) Foreign Application Priority Data
Dec. 20, 2019 (DE) .................. 102019135586.9

(51) Int. Cl.
*G01L 19/00* (2006.01)
(52) U.S. Cl.
CPC ...... *G01L 19/0046* (2013.01); *G01L 19/0038* (2013.01)

(58) Field of Classification Search
CPC ............ G01L 19/0046; G01L 19/0038; G01L 13/025; G01L 13/026; G01L 19/0645; F16J 3/02
(Continued)

(56) References Cited

U.S. PATENT DOCUMENTS

| 5,495,768 A | 3/1996 | Louwagie et al. |
| 2007/0000332 A1 | 1/2007 | Boehler et al. |

FOREIGN PATENT DOCUMENTS

| CN | 1121369 A | 4/1996 |
| CN | 101198852 A | 6/2008 |

(Continued)

OTHER PUBLICATIONS

Di Giovanni, Mario, Flat and Corrugated Diaphragm Design Handbook, Table of contents, Marcel Dekker, Inc., New York and Basel.

*Primary Examiner* — Robert R Raevis
(74) *Attorney, Agent, or Firm* — Christopher R. Powers; Endress+Hauser (USA) Holding, Inc.

(57) ABSTRACT

A separating membrane includes: a planar edge region for the joining of the separating membrane to a diaphragm seal body; a working region offset in an axial direction relative to the edge region; and a transition region between the edge region and the working region, wherein the transition region extends over a radial region of not more than one quarter of an outer radius of the transition region, wherein the working region has a substantially planar center and an embossed pattern or undulation pattern between the center and an outer edge of the working region, wherein from the rest position to a point of deflection with a dimensionless pressure equivalent, the separating membrane has a characteristic curve in which, for a coefficient of determination R2 of a linear regression of the characteristic curve, the following applies: (1−R2)<1%.

18 Claims, 2 Drawing Sheets

(58) Field of Classification Search
USPC .......... 73/706, 715–728; 277/590, 634, 636, 277/641, 642, 648, 649
See application file for complete search history.

(56) References Cited

FOREIGN PATENT DOCUMENTS

| | | | | |
|---|---|---|---|---|
| CN | 102099604 A | 6/2011 | | |
| CN | 102449535 A | 5/2012 | | |
| CN | 108240885 A * | 7/2018 | ........... | G01L 13/026 |
| DE | 3919299 A1 | 1/1990 | | |
| DE | 10152681 A1 * | 4/2003 | ......... | G01L 19/0645 |
| DE | 102005027035 A | 6/2005 | | |
| DE | 102012109587 A1 | 4/2014 | | |
| DE | 102015110351 A | 6/2015 | | |
| EP | 1114987 A2 | 7/2001 | | |
| EP | 2300739 A1 | 3/2011 | | |
| WO | 9425843 A1 | 11/1994 | | |
| WO | 2005045345 A2 | 5/2005 | | |
| WO | 2014056715 A2 | 4/2014 | | |
| WO | WO-2016206923 A1 * | 12/2016 | ......... | G01L 19/0046 |

* cited by examiner

SEPARATING MEMBRANE, DIAPHRAGM SEAL WITH A SEPARATING MEMBRANE OF SAID TYPE, AND PRESSURE MEASURING UNIT WITH A DIAPHRAGM SEAL OF SAID TYPE

CROSS-REFERENCE TO RELATED APPLICATIONS

The present application is related to and claims the priority benefit of German Patent Application No. 10 2019 135 586.9, filed on Dec. 20, 2019, and International Patent Application No. PCT/EP2020/084091, filed Dec. 1, 2020, the entire contents of which are incorporated herein by reference.

TECHNICAL FIELD

The present invention relates to a separating membrane and a diaphragm seal with a separating membrane of said type and a pressure measuring unit with a diaphragm seal of said type.

BACKGROUND

In industrial process measurement technology, it is customary to transfer a pressure to be measured to a pressure sensor by means of a hydraulic transfer fluid. In this case, the transfer fluid is separated, by means of a separating membrane, from a medium whose pressure is to be measured. Separating membranes usually feature a metallic material and are corrugated in order to achieve a linear relationship between pressure and volume stroke via a greater volume stroke.

The separating membranes are in particular deflected by the thermal expansion of the transfer fluid. By contrast, the pressure-dependent deflection is comparatively low in most cases. The deflection of the separating membranes is concomitant with a pressure difference between the volumes separated by the separating membrane, which pressure difference acts as a measurement error. The separating membranes should be as soft as possible so that said measurement error remains small. Patent EP 2 300 739 B1 discloses an extremely soft separating membrane with a non-axisymmetrical shape, which is extremely soft. However, this separating membrane is comparatively expensive to produce. Therefore, there continues to be a need for optimized axisymmetrical separating membranes, wherein, in principle, a greater rigidity is to be expected. In order to be able to compensate easily for the pressure difference caused by the separating membrane, it is advantageous if the characteristic curve runs as linearly as possible between pressure and volume.

Di Giovanni gives an overview of the quantitative description of the properties of separating membranes according to the prior art in "Flat and corrugated diaphragm design handbook," ISBN 0-8247-1281-1. Accordingly, the dimensionless characteristic equation for a so-called sinus membrane, i.e., a separating membrane with a regular undulation pattern, is given as:

$$\frac{pa^4}{Eh^4} = A_p \frac{y}{h} + B_p \frac{y^3}{h^3}$$

Here, p is the pressure difference between the two sides of the separating membrane, which causes a deflection, E is the modulus of elasticity of the material of the separating membrane, a is the diameter of the separating membrane, h is its material thickness, and y is the deflection of the center of the separating membrane caused by the pressure difference. The volume V corresponding to the deflection y of the center can then, for example, be estimated with a paraboloid approximation to $V=\pi a^2 y/2$ or with a cone approximation to $V=\pi a^2 y/3$.

The coefficients $A_p$ and $B_p$ are a function of a profile factor q of the undulation pattern and are given as:

$$A_p = \frac{2(3+q)(1+q)}{3(1-\mu^2/q^2)}$$

and $$B_p = \frac{32}{q^2 - 9}\left[\frac{1}{6} - \frac{3-\mu}{(q-\mu)(q+3)}\right],$$

where μ and is the Poisson's ratio of the material of the separating membrane, and profile factor q is given as a function of the profile depth H as:

$$q = \sqrt{\frac{3}{2}\frac{H^2}{h^2} + 1}$$

It can be seen that the linear coefficient $A_p$ increases as q increases, while the cubic coefficient $B_p$ falls as q increases. This means that the separating membranes with a greater embossing depth H are more rigid in the case of small deflections, but deviate less strongly from linearity in the case of larger deflections.

However, the embossing depth H cannot be arbitrarily increased for the common separating membrane materials, e.g., steel of the type 1.4435. It is limited to maximum values for H/h<4. Therefore, limits are set with respect to the linearity of the separating membrane characteristic curves of separating membranes with a regular undulation pattern.

SUMMARY

It is therefore the aim of the present disclosure to provide a separating membrane with improved linearity. The aim is achieved by a separating membrane, a diaphragm seal, and a pressure measuring unit according to the present disclosure.

The separating membrane according to the invention comprises:
  an, in particular, planar edge region for the joining of the separating membrane to a diaphragm seal body;
  a working region which is offset in an axial direction in relation to the edge region by at least three membrane thicknesses, in particular by seven half membrane thicknesses;
  a transition region between the edge region and the working region, which extends over a radial region of at least one eighth, e.g., not less than one seventh, in particular not less than one sixth, of the outer radius of the transition region, wherein the transition region extends over a radial region of not more than one quarter, in particular not more than one fifth, of the outer radius of the transition region;

wherein the working region has a substantially planar center whose radius is in particular not less than one sixth of the outer radius of the transition region, wherein the working region between the substantially planar center and the edge of the working region has an embossed pattern or undulation pattern, wherein, in particular, from the rest position to a dimensionless pressure equivalent p* of not less than 250, in particular of not less than 300, the separating membrane has a characteristic curve p*(w), wherein, for the coefficient of determination $R^2$ of a linear regression of the characteristic curve, the following applies: $(1-R^2) < 1\%$, e.g., $(1-R^2) < 0.5\%$, in particular $(1-R^2) < 0.25\%$.

In an embodiment of the invention, for the slope S=dp*(w)/dw of the above linear regression, S<24, in particular S<20.

The dimensionless pressure equivalent p* is given as:

$$p^* = \frac{p}{E} \cdot \left(\frac{a}{h}\right)^4$$

The dimensionless deflection w is given as:

$$w := \frac{y}{h} = \frac{3 \cdot V}{\pi \cdot a^2 \cdot h}$$

In the above equations, p is the pressure difference between the two membrane sides, E is the modulus of elasticity of the membrane material, a is the membrane radius, h is the membrane thickness, and y is the deflection of the membrane center assuming the cone approximation at a given volume displacement V, which produces the pressure difference p.

In a further embodiment of the invention, the undulation pattern adjoins the planar center and extends up to the edge of the working region.

In a further embodiment of the invention, the amplitude of the undulation pattern decreases from the inside to the outside.

In a further embodiment of the invention, the radius of the planar center is not more than one sixth, e.g., not more than one seventh, in particular not more than one eighth, of the outer radius of the transition region.

In a further embodiment of the invention, the undulation pattern has not more than seven half wave trains, e.g., not more than six half wave trains, and in particular not more than five half wave trains.

In a further embodiment of the invention, the innermost wave train of the undulation pattern between the two extreme values has an axial distance of not less than one membrane thickness, in particular of not less than five quarter membrane thicknesses.

In a further embodiment of the invention, the innermost wave train of the undulation pattern between the two extreme values has an axial distance of not more than two membrane thicknesses, e.g., not more than seven quarter membrane thicknesses, in particular not more than three half membrane thicknesses.

In a further embodiment of the invention, the outermost wave train of the undulation pattern between the two extreme values has an axial distance of not more than three quarter membrane thicknesses, e.g., not more than half a membrane thickness.

In a further embodiment of the invention, the transition region has a frustoconical shape.

In a further embodiment of the invention, an average wave train of the undulation pattern is not less than six membrane thicknesses, e.g., not less than seven membrane thicknesses.

In a further embodiment of the invention, an average wave train of the undulation pattern is not more than ten membrane thicknesses, e.g., not more than nine membrane thicknesses.

In a further embodiment of the invention, the outer radius of the transition region is not less than two hundred times, e.g., not less than two hundred and fifty times, in particular not less than two hundred and seventy times, the membrane thickness.

In a further embodiment of the invention, the outer radius of the transition region is not more than three hundred and sixty times, e.g., not more than three hundred times, the membrane thickness.

In a further embodiment of the invention, from the rest position to the point of deflection a dimensionless pressure equivalent p* of not less than 250, in particular of not less than 300, the separating membrane has a substantially axisymmetrical shape.

The diaphragm seal according to the invention comprises:
a separating membrane according to the invention; and
a diaphragm seal body, wherein the diaphragm seal body has an annular support surface surrounding a membrane bed; wherein the edge region is joined to the support surface to form a diaphragm seal chamber between the diaphragm seal body and the separating membrane.

The pressure measuring unit according to the invention comprises a diaphragm seal according to the invention, a pressure sensor element, and a hydraulic path which communicates with the diaphragm seal chamber for transferring a pressure prevailing in the diaphragm seal chamber to the sensor element by means of a transfer fluid, wherein the total quantity of the transfer fluid in the pressure chamber and in the hydraulic path is measured such that the separating membrane is deflected from its rest position to the extent that the pressure exerted on the transfer fluid by the separating membrane for temperatures between 300 K and 550 K exceeds the vapor pressure of the transfer fluid.

BRIEF DESCRIPTION OF THE DRAWINGS

The invention is explained in the following in further detail on the basis of the exemplary embodiments shown in the figures. The following are shown.

DETAILED DESCRIPTION

FIG. 1 shows a p(V) diagram in which characteristic curves of various separating membranes are shown. The dot-dash characteristic curve and the double dot-dash lines show characteristic curves of separating membranes determined using paraboloid approximation and having a diameter of 17.5 mm according to di Giovanni with a ratio of H/h=2 and H/h=4 at a separating membrane thickness of 25 μm.

Figure 2:
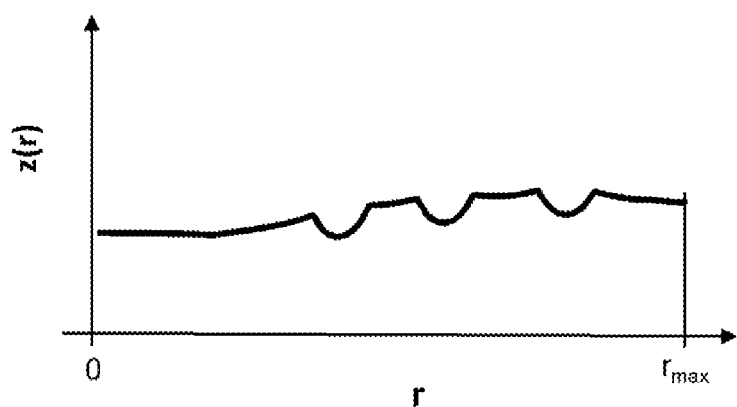
FIG. 2 shows a profile, z(r), of a separating membrane according to the prior art.

The dotted characteristic curve shows measurement data of a separating membrane having a diameter of 17.5 mm and a separating membrane thickness of 25 μm. The profile of the separating membrane in the rest position of the separating membrane is shown in FIG. 2. The separating membrane has three, embossed, concentric, annular half-waves which point in the same direction with respect to their immediate surroundings, viz., downwards in FIG. 2. The embossing depth H has the same thickness as approximately 2 separating membranes. The basic shape of the separating membrane is not planar, but has a center which has been lowered by approximately 2.5 separating membrane thicknesses relative to the edge. The characteristic curve runs substantially parallel to the characteristic curve with an embossing depth of H/h=2 according to di Giovanni, with a planar basic shape. While, with an embossing depth of H/h=4, a separating membrane according to di Giovanni with a planar basic shape has a smaller deviation from linearity, it is still such that it is difficult to compensate for the measurement error due to the deflection of the separating membrane, particularly in the case of volumes of more than 20 μL. It should also be pointed out that, when estimating the volume stroke using cone approximation, the volume associated with a deflection y is smaller by one third. The deviations from linearity would therefore be even more pronounced for separating membranes according to di Giovanni when estimating using cone approximation. The solid line, on the other hand, shows the characteristic curve of an exemplary embodiment of a separating membrane according to the invention with a diameter of 17 mm, which has an almost constant stiffness up to a volume stroke of 40 μL relative to the rest position. This means a considerable improvement over the prior art with regard to the linearity of the separating membrane.

Figure 1A:
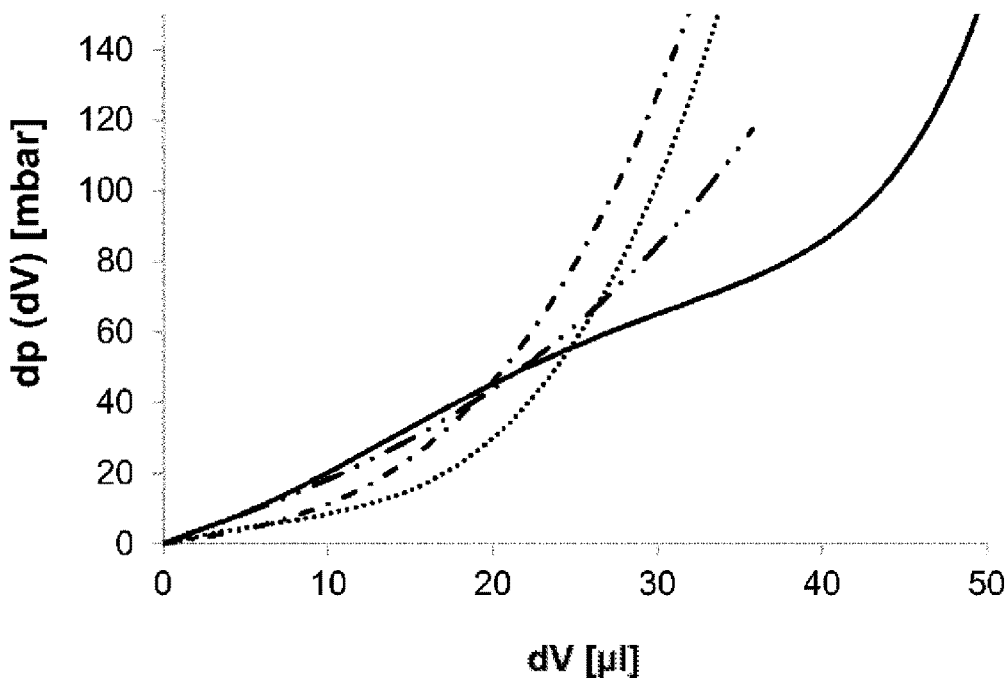
FIG. 1a shows characteristic curves of various separating membranes according to the prior art (broken lines) and of an exemplary embodiment of a separating membrane according to the invention (solid line)
Figure 1B:
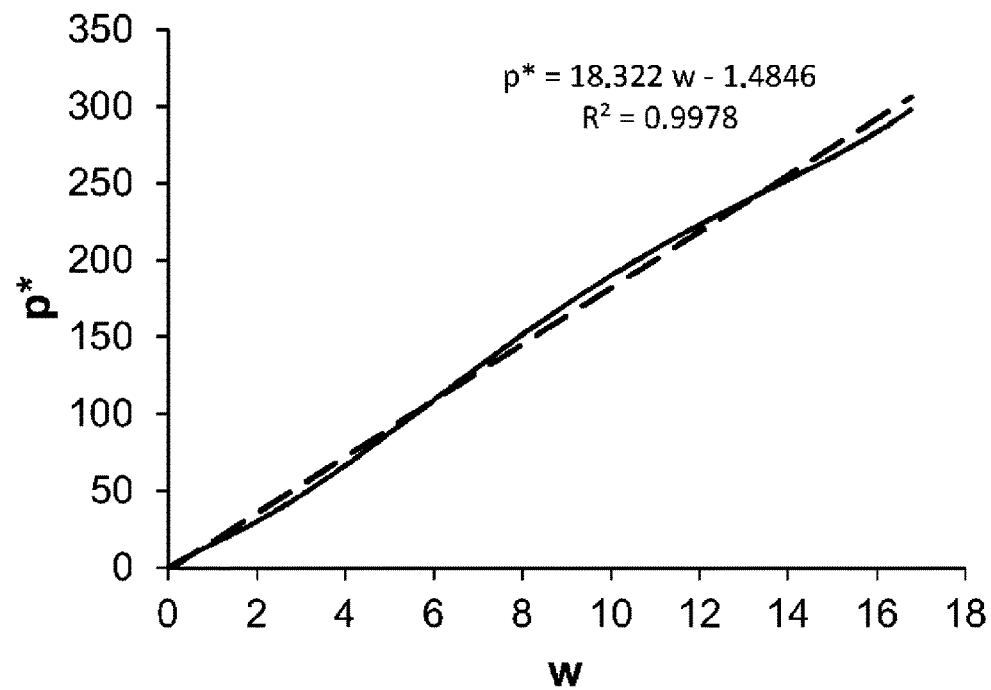
FIG. 1b shows a characteristic curve of an exemplary embodiment of a separating membrane according to the present disclosure in dimensionless coordinates.

In FIG. 1b, the characteristic curve of the separating membrane according to the invention is represented without dimensions, irrespective of the specific measurements and materials. On the basis of such a representation, separating membranes of different dimensions can be compared with one another. In the case of a dimensionless deflection w of approximately 17 determined using cone approximation, a dimensionless pressure equivalent p* of approximately 300 is achieved.

The dimensionless pressure equivalent p* is given as:

$$p^* = \frac{p}{E} \cdot \left(\frac{a}{h}\right)^4$$

The dimensionless deflection w is given as:

$$w := \frac{y}{h} = \frac{3 \cdot V}{\pi \cdot a^2 \cdot h}$$

In the above equations, p is the pressure difference between the two membrane sides, E is the modulus of elasticity of the membrane material, a is the membrane radius, h is the membrane thickness, and y is the deflection of the membrane center assuming the cone approximation at a given volume displacement V, which produces the pressure difference p.

The slope S=dp*/dw of a linear regression of the characteristic curve for the deflection between p*=0 and p*=300 is less than 20, and, for the degree of determination $R^2$, the following applies: $(1-R^2)<0.25\%$. This value combination cannot be achieved with the sinus membranes according to di Giovanni and the membrane shape according to the prior art shown in FIG. 2.

Figure 3:
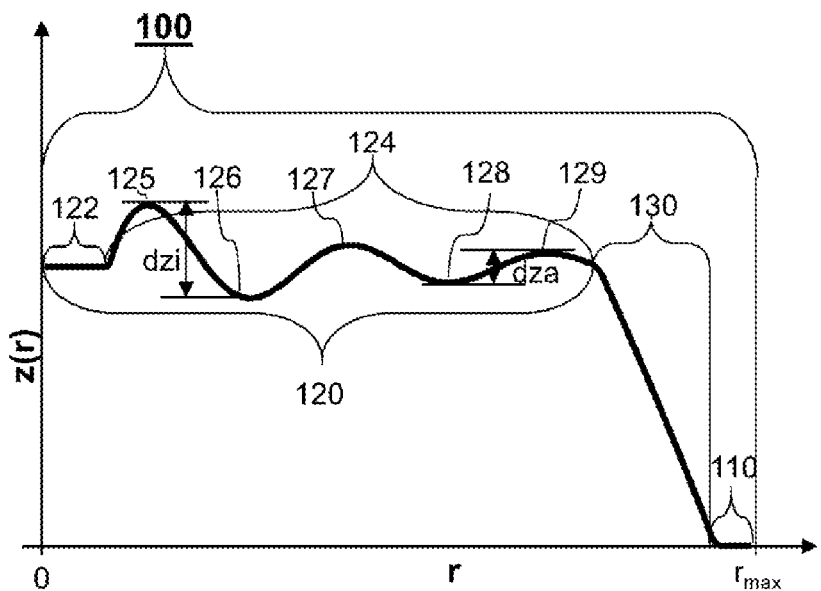
FIG. 3 shows a profile, z(r), of an exemplary embodiment of a separating membrane according to the present disclosure.

FIG. 3 shows the membrane center line z(r) of the exemplary embodiment of a separating membrane 100 according to the invention, the characteristic curve of which is shown in FIGS. 1a and 1b.

The separating membrane 100 comprises a planar edge region 110 and a working region 120 which are connected to one another by a substantially frustoconical transition region 130. It is provided for the separating membrane 100 to be connected to a diaphragm seal body along an outer radius of the edge region 110 by means of a circumferential joint. The working region comprises a substantially planar center 122, which is surrounded by an undulation pattern 124 that extends as far as an outer edge of the working region, to which the transition region 130 adjoins. The planar center 122 does not have any undulation patterns that contribute to an increase in the volume stroke. An undulation pattern in this region would also be of little help as a contribution to the total volume stroke, because the volume below the center is very small due to the small radii. Nevertheless, contours can occur in the planar center 122, e.g., when the separating membrane 100 is embossed on a membrane bed, which has an opening for the transfer fluid in its center. Even if the contour of such an opening is embossed in the planar center 122, the latter is still considered a planar center in the sense of the invention.

The separating membrane 100 has a metallic material, in particular a media-resistant steel, e.g., 1.4435, and has a material thickness of approximately 30 μm. The outer radius of the separating membrane 100 is approximately 8.5 mm. The outer radius of the transition region 130 is about 8.2 mm, while the inner radius of the transition region is not more than 8 mm. The height of the transition region is more than four membrane thicknesses.

The undulation pattern has five half wave trains, the amplitude of which decreases from the inside to the outside. Thus, the difference between the two outer extrema of the undulation pattern is approximately one third of a membrane thickness, while the difference between the two inner extrema of the undulation pattern is approximately four thirds of the membrane thickness. The radius of the planar center 122 is approximately one tenth of the radius of the separating membrane 100.

The separating membrane formed in this way shows the observed linear behavior. The shape is obtained by embossing a planar circular membrane blank, which is joined along its edge to a diaphragm seal body, on a membrane bed of the diaphragm-seal body, the contour of which serves as a die for the separating membrane.

Figure 4:
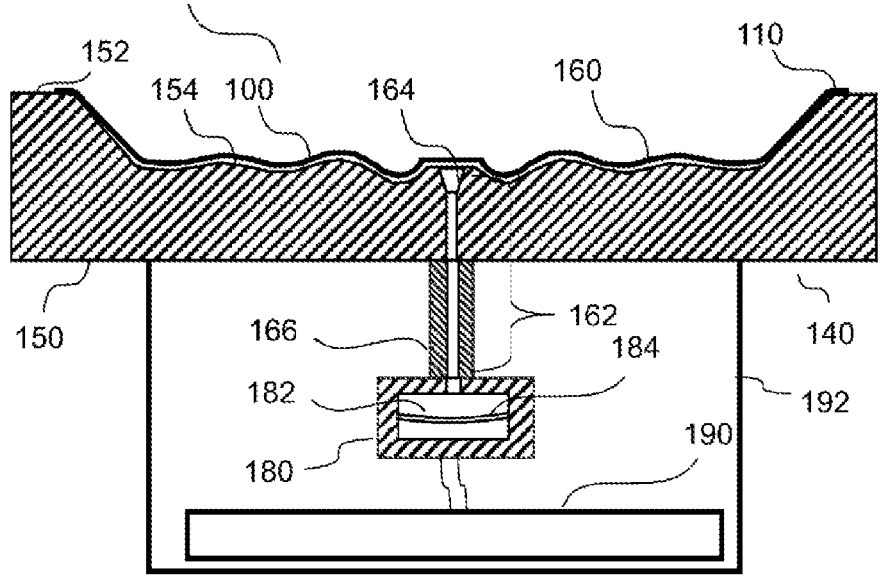
FIG. 4 shows a longitudinal view through an exemplary embodiment of a pressure measuring unit according to the present disclosure.

FIG. 4 shows a pressure measuring unit 200 according to the invention, which comprises a diaphragm seal 140 according to the invention with a separating membrane 100 according to the invention. The separating membrane 100 is joined along an outer radius of its edge region 110 to a circumferential joint with an edge region 152 of the diaphragm seal body 150, wherein a planar circular membrane blank is joined to the diaphragm seal body 150, and the final shape of the separating membrane 100 is produced by embossing the circular membrane blank on a membrane bed 154 of the diaphragm-seal body 150. Due to the elasticity of the material of the separating membrane 100, the latter springs back after the embossing on the membrane bed 154 into its equilibrium position defined by the embossing, as a result of which a diaphragm seal chamber 160 is formed between the separating membrane 100 and the diaphragm seal body 150. A hydraulic path 162 extends from the diaphragm seal chamber 160 to a pressure sensor element 180 in order to apply a pressure prevailing in the diaphragm seal chamber 160 to a measuring membrane 184 in a sensor chamber 182 of the pressure sensor element 180. The hydraulic path 162 comprises a bore 164 through the diaphragm seal body 150, and a capillary line 166, which extends between the diaphragm seal body 150 and the pressure sensor element 180. The quantity of a transfer fluid in the space enclosed between the separating membrane 100 and the measuring membrane 184 is selected such that the separating membrane is already slightly pre-stressed at 300 K, so that, above 300 K, the pressure on the transfer fluid caused by the pre-stress is higher than the vapor pressure of the transfer fluid. In this way, the transfer fluid is prevented from outgassing when a media pressure present at the separating membrane falls below the vapor pressure of the transfer fluid.

The pressure sensor element has an electrical converter, not shown in detail here, in order to provide a pressure-dependent primary signal, which is processed by a measuring circuit 190 of the pressure measuring unit 200. The pressure measuring unit 200 furthermore has a substantially metallic housing 192, in which the pressure sensor element 180 and the measuring circuit 190 are arranged, wherein the housing 192 is connected here to the diaphragm seal body 150.

The invention claimed is:

1. A separating membrane, comprising:
   a planar edge region configured to facilitate joining of the separating membrane to a diaphragm seal body;
   a working region offset in an axial direction relative to the edge region by at least three thicknesses of the separating membrane; and
   a transition region between the edge region and the working region, which extends over a radial region of at least one eighth of an outer radius of the transition region, wherein the transition region extends over a radial region of not more than one quarter of the outer radius of the transition region,
   wherein the working region has a substantially planar center whose radius is not less than one sixth of the outer radius of the transition region,
   wherein the working region between the center and an outer edge of the working region includes an embossed pattern or undulation pattern,
   wherein the edge region, working region, transition region, and center region of the separating membrane are configured such that a characteristic curve of the separating membrane, from a rest position to a point of deflection with a dimensionless pressure equivalent of not less than 250, has a coefficient of determination ($R^2$) of a linear regression of the characteristic curve for which the following applies: $(1-R^2)<0.01$.

2. The separating membrane of claim 1, wherein the transition region extends over a radial region of not less than one sixth of the outer radius of the transition region, and/or wherein the transition region extends over a radial region of not more than one fifth of the outer radius of the transition region.

3. The separating membrane of claim 1, wherein the separating membrane is configured such that, for the coefficient of determination ($R^2$) of the linear regression of the characteristic curve, the following applies: $(1-R^2)<0.0025$.

4. The separating membrane of claim 1, wherein the undulation pattern adjoins the planar center and extends to the outer edge of the working region.

5. The separating membrane of claim 1, wherein an amplitude of the undulation pattern decreases from inside to outside.

6. The separating membrane of claim 1, wherein the radius of the planar center is not more than one sixth of the outer radius of the transition region.

7. The separating membrane of claim 1, wherein the undulation pattern has not more than seven half wave trains.

8. The separating membrane of claim 1, wherein an innermost wave train of the undulation pattern between two extreme values of the wave train has an axial distance of not less than one membrane thickness.

9. The separating membrane of claim 1, wherein an innermost wave train of the undulation pattern between two extreme values of the wave train has an axial distance of not more than two membrane thicknesses.

10. The separating membrane of claim 1, wherein an outermost wave train of the undulation pattern between two extreme values of the wave train has an axial distance of not more than three quarters of a membrane thickness.

11. The separating membrane of claim 1, wherein the transition region has a frustoconical shape.

12. The separating membrane of claim 1, wherein an average wavelength of the undulation pattern is not less than six membrane thicknesses.

13. The separating membrane of claim 1, wherein an average wavelength of the undulation pattern is not more than 10 membrane thicknesses.

14. The separating membrane of claim 1, wherein the outer radius of the transition region is not less than 200 times the membrane thickness.

15. The separating membrane of claim 1, wherein the outer radius of the transition region is not more than 360 times the membrane thickness.

16. The separating membrane of claim 1, wherein, from the rest position to the point of deflection with the dimensionless pressure equivalent of not less than 250, the separating membrane has a substantially axisymmetrical shape.

17. A diaphragm seal, comprising:
   a separating membrane according to claim 1; and
   a diaphragm seal body, wherein the diaphragm seal body includes an annular support surface surrounding a membrane bed,
   wherein the edge region of the separating membrane is joined to the support surface of the diaphragm seal body to define a diaphragm seal chamber between the diaphragm seal body and the separating membrane.

18. A pressure measuring unit, comprising:
   a diaphragm seal according to claim 17;
   a pressure sensor element; and
   a hydraulic path in communication with the diaphragm seal chamber and configured to transfer a pressure prevailing in the diaphragm seal chamber to the sensor element via a transfer fluid,
   wherein a total amount of the transfer fluid in the pressure chamber and in the hydraulic path is such that the separating membrane is deflected from its rest position to an extent that a pressure exerted on the transfer fluid by the separating membrane at temperatures between 300 K and 550 K exceeds the vapor pressure of the transfer fluid.

* * * * *